United States Patent Office 3,438,961
Patented Apr. 15, 1969

3,438,961
DISAZO DYES FOR HYDROPHOBIC FIBERS
David J. Wallace, Max A. Weaver, and James M. Straley, Kingsport, Tenn., assignors to Eastman Kodak Company, Rochester, N.Y., a corporation of New Jersey
No Drawing. Filed Nov. 19, 1965, Ser. No. 508,847
Int. Cl. C09b 29/38, 62/40; C08g 51/66
U.S. Cl. 260—152
10 Claims

ABSTRACT OF THE DISCLOSURE

Disazo compounds prepared by coupling a diazotized aminoazobenzene with an aniline coupler, in which the aniline nitrogen atom is substituted with a dicarboximidoalkyl group, are useful as dyes for hydrophobic textile materials.

This invention relates to disazo compounds particularly useful as dyes for textile fibers, yarns and fabrics. More particularly, this invention relates to disazo compounds of the general formula

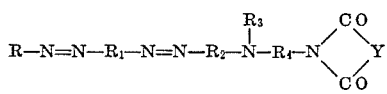

I wherein

R represents a monocyclic carbocyclic aromatic radical of the benzene series including unsubstituted and substituted phenyl such as lower alkylphenyl, e.g., o,m,p-tolyl; lower alkoxyphenyl, e.g., o,m,p-methoxyphenyl; halonitrophenyl; lower alkylsulfonylphenyl, e.g., o,m,p-methylsulfonylphenyl; lower alkylsulfonamidophenyl, e.g., o,m,p-methylsulfonamidophenyl; lower di(alkylsulfonyl)-phenyl, e.g., 2,5-di(methylsulfonyl)phenyl; dicarboxylic-acidimidophenyl, e.g., o,m,-succinimidophenyl; trifluoromethylphenyl; lower alkanoylamino, e.g., o,m,p-acetamidophenyl; cyanophenyl, e.g., o,m,p-cyanophenyl; carboxamidophenyl, e.g., o,m,p-carboxamidophenyl; benzamidophenyl; thiocyanophenyl, e.g., o,m,p-thiocyanophenyl; lower alkylthiophenyl, e.g., o,m,p-methylthiophenyl; benzaminophenyl, e.g., o,m,p-benzaminophenyl, benzylaminophenyl, e.g., o,m,p-benzylaminophenyl; formylphenyl, e.g., o,m,p-formylphenyl; carbalkoxyphenyl, e.g., o,m,p-carbethoxyphenyl; benzoylphenyl, e.g., o,m,p-benzoylphenyl; etc.

$R_1$ and $R_2$ represent monocyclic carbocyclic aromatic radicals of the benzene series including unsubstituted p-phenylene and p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkanoylamino, e.g. o,m-acetamido-p-phenylene; benzamido; or lower alkylsulfonamido, e.g. o,m-methylsulfonamido-p-phenylene.

$R_3$ represents hydrogen or an alkyl radical preferably lower alkyl, i.e., from 1 to 4 carbon atoms, being unsubstituted or substituted such as lower hydroxyalkyl, e.g., hydroxyethyl; lower polyhydroxyalkyl, e.g., 2,3-dihydroxypropyl; lower alkoxyalkyl, e.g., methoxyethyl; lower cyanoalkyl, e.g., cyanoethyl; lower alkanoyloxyalkyl, e.g., acetoxyethyl; lower carboalkoxyalkyl, e.g., carbethoxyethyl; lower halogenoalkyl, e.g., chloroethyl; lower hydroxyhalogenoalkyl, e.g., β-hydroxy-γ-chloropropyl; lower alkylsulfonylalkyl, e.g., methylsulfonylethyl; lower alkyl—OCOOCH$_2$CH$_2$—, e.g.,

CH$_3$OCOOCH$_2$CH$_2$— carbamoylalkyl, e.g., carbamoylethyl benzyl, lower phenoxyalkyl, e.g., β-phenoxyethyl; lower alkylsulfonamidoalkyl, e.g., methylsulfonamidoethyl; lower alkylcarbamoylalkyl, e.g. ethylcarbamoylethyl; lower alkanoylaminoalkyl, e.g. acetamidoethyl; phenylcarbamoyloxyalkyl, e.g. phenylcarbamoyloxyethyl; etc. or $R_3$ represents cyclohexyl or a monocyclic carbocyclic aromatic group of the benzene series, e.g. unsubstituted phenyl and substituted phenyl such as represented by $R_1$ above e.g. lower alkylphenyl, lower alkoxyphenyl, halophenyl etc. As can be seen from the examples below, the substituents attached to R, $R_1$, $R_2$ and $R_3$ serve primarily as auxochrome groups to control the color of the disazo compounds.

$R_4$ represents a lower alkylene group i.e. a straight or branched aliphatic chain of from 1 to 4 C atoms, and Y represents a chain of carbon atoms necessary to complete a ring of 5 or 6 members i.e. a dicarboximido group, such as succinimido, maleimido, citraconimido etc. and dicarboximido groups having fused-on nuclei such as phthalimido, derived from the corresponding anhydride.

Typical substituted and unsubstituted carbon chains represented by Y are —C$_2$H$_4$—,

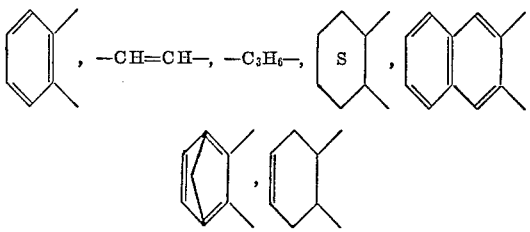

Typical radicals represented by

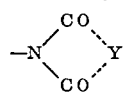

are:

succinimido
phthalimido
tetrachloro phthalimido
tetrahydro phthalimido
hexahydro phthalimido
4-carboxy phthalimido
3-nitro phthalimido
3-methyl phthalimido
3-aminophthalimido
glutarimido
bicyclo[2.2.1]-5-heptene-2,3-dicarboximido

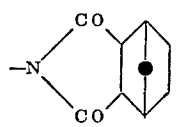

1,8-naphthalimido
citraconimido
cycloalkanedicarboximido e.g.

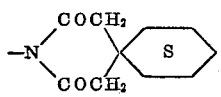

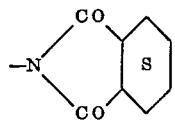

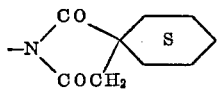

alkyl succinimido e.g.

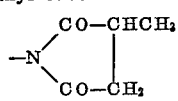

alkenyl succinimido e.g.

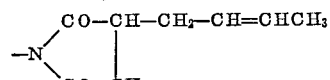

campherimido

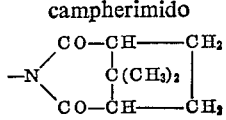

The disazo compounds of this invention are prepared by diazotization of amino azo compounds, $$R-N=N-R_1-NH_2,$$

wherein R and $R_1$ are as defined above, and coupling the diazotized products with the coupler of the general formula II 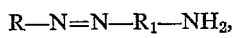

wherein $R_2$, $R_3$, $R_4$ and Y have the meanings given above.

The coupling components having Formula II are prepared by one of the two following methods:

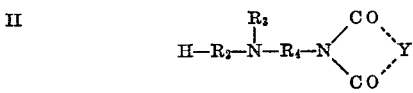

or anhydride

The detailed preparation of the coupler II is described in U.S. Patent 3,161,631.

Herein, "lower alkyl group," "Lower alkylene group" and the like, means that the group contains a chain of from 1 to 4 carbon atoms, straight or branch chained.

The disazo compounds can be used for dyeing textile materials including synthetic polymer fibers, yarns and fabrics giving fast orange to red shades when applied by conventional dyeing methods to polyester fibers. The disazo compounds also have good affinity for cellulose ester and polyamide fibers. When the disazo compounds are used for dyeing such hydrophobic materials, they should be free of water-solubilizing groups such as sulfo and carboxyl groups. In general, the dyes have good fastness, for example, to light, washing, gas (atmospheric fumes) and sublimation. Thus, the disazo compounds in general can be expected to be superior to similar disazo compounds when tested as textile dyes by methods such as described in the A.A.T.C.C. Technical Manual, 1964 edition, depending in part upon the particular dye used and the fiber being dyed.

The disazo compounds can also be expected to possess substantially different dyeing properties than do the related monoazo compounds of U.S. Patent 3,148,178 when used for dyeing certain fibers such as polyamide fibers.

As can be seen from the examples below, the various substituents attached to radicals R, $R_1$, $R_2$, $R_3$ and Y serve primarily as auxochrome groups and disazo compounds particularly useful as textile dyes are obtained within a wide range of substitution.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new disazo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodak polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the disazo compounds.

The disazo compounds of the invention may be used for dyeing hydrophobic fibers such as linear polyester, cellulose ester, acrylic, polyamide, etc. fibers in the manner described in U.S. Patents 2,880,050, 2,757,064, 2,782,187, and 2,043,827. The following examples illustrate methods by which the disazo compounds of the invention can be used to dye polyester textile materials.

0.1 gram of the dye is dissolved in the dye pot by warming in 5 cc. ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material.

The following examples will serve to illustrate our invention.

Example 1

1.8 g. dry $NaNO_2$ was dissolved in 12.5 cc. conc. $H_2SO_4$. This solution was cooled to about 5° C. and 25 cc. 1:5 acid (1 part propionic to 5 parts acetic acid) was added below 10° C. Then 5.97 g. of 1-amino-2,5,2'-trimethylazobenzene was added, followed by 25 cc. of 1:5 acid.

The reaction mixture was stirred 2 hr. at ice-bath temperature, then added to a solution of 6.5 g. of N-β-succinimidoethyl-N-ethyl-m-toluidine in 50 cc. 1:5 acid at 5° C. The coupling mixture was neutralized to Congo Red with solid ammonium acetate. After coupling 2 hr. the mixture was drowned in water, filtered, washed with water, and dried. The product dyed polyester and nylon fibers a brilliant red shade with excellent fastness properties on Kodel and nylon. The dye has the structure:

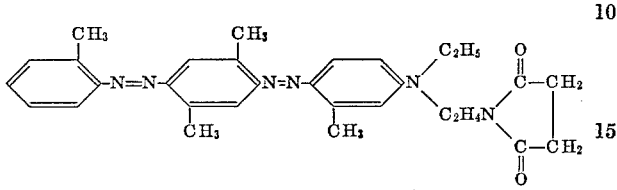

The disazo compounds of the following table, having Formula III below, are prepared by the process of Example 1 by diazotizing the indicated aminoazobenzene and coupling with the indicated coupling component.

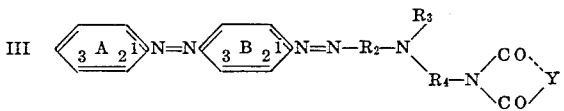

$R_1$ and $R_2$ are the same or different and each is p-phenylene or p-phenylene substituted with lower alkyl, lower alkoxy, halogen, lower alkanoylamino, benzamido, or lower alkylsulfonamido;

$R_3$ is hydrogen; lower alkyl; lower alkyl substituted with hydroxy, lower alkoxy, cyano, lower alkanoyloxy, lower carboalkoxy, halogen, lower alkylsulfonyl, carbamoyl, lower alkylcarbamoyl, phenoxy, lower alkanoylamino, phenylcarbamoyloxy, or lower alkylsulfonamido; benzyl; cyclohexyl; lower alkyl-OCOOCH$_2$CH$_2$—; phenyl; or phenyl substituted with lower alkyl, lower alkoxy, or halogen;

$R_4$ is lower alkylene; and

Y represents the atoms of a carbon chain which with

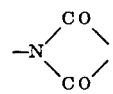

complete a ring of 5 to 6 members.

2. A compound of the formula of claim 1 wherein $R_3$ is lower alkyl.

3. A compound of the formula of claim 1 wherein $R_3$ is lower alkyl and Y is —CH$_2$CH$_2$—.

4. A compound of the formula of claim 1 wherein $R_3$ is lower alkyl and Y is o-phenylene.

5. A compound of the formula of claim 1 wherein R is phenyl or lower alkylphenyl; $R_1$ and $R_2$ each is p-

| No. | A | B | Substituents of ring R$_2$ | R$_3$ | R$_4$ | —N(CO)$_2$Y | Color on Polyesters |
|---|---|---|---|---|---|---|---|
| 2 | none | none | phenylene | —CH$_2$CH$_3$ | —CH$_2$CH$_2$— | phthalimido | orange. |
| 3 | none | none | do | —CH$_2$CH$_3$ | —CH$_2$CH$_2$— | succinimido | Do. |
| 4 | none | none | do | —CH$_2$CH$_3$ | —CH$_2$CH$_2$— | maleimido | Do. |
| 5 | none | none | do | —CH$_2$CH$_3$ | —CH$_2$CH$_2$— | nitrophthalimido | Do. |
| 6 | none | none | do | —CH$_2$CH$_3$ | —CH$_2$CH$_2$— | tetrachlorophthalimido | Do. |
| 7 | none | none | do | —CH$_2$CH$_3$ | —CH$_2$CH$_2$— | hexahydrophthalimido | Do. |
| 8 | none | none | do | —CH$_2$CH$_3$ | —CH$_2$CH$_2$— | citraconimido | Do. |
| 9 | none | none | do | —CH$_2$CH$_3$ | —CH$_2$CH$_2$— | 4-carboxyphthalimido | Do. |
| 10 | 2-CH$_3$ | 2-CH$_3$ | m-tolyl | —CH$_2$CH$_3$ | —CH$_2$CH$_2$— | succinimido | red. |
| 11 | 2-CH$_3$ | 2-CH$_3$ | do | —CH$_2$CH$_3$ | —CH$_2$CH$_2$— | maleimido | red. |
| 12 | 2-CH$_3$ | 2-CH$_3$ | do | —CH$_2$CH$_3$ | —CH$_2$CH$_2$— | phthalimido | red. |
| 13 | 4-CH$_3$ | 3-CH$_3$ | do | —CH$_2$CH$_3$ | —CH$_2$CH$_2$— | do | red. |
| 14 | 4-CH$_3$ | 3-CH$_3$ | do | —CH$_2$CH$_3$ | —CH$_2$CH$_2$— | succinimido | red. |
| 15 | 3-CH$_3$ | 3-CH$_3$ | do | —CH$_2$CH$_3$ | —CH$_2$CH$_2$— | maleimido | red. |
| 16 | 3-CH$_3$ | 3-CH$_3$ | do | —CH$_2$CH$_3$ | —CH$_2$CH$_2$— | succinimido | red. |
| 17 | 4-OCH$_3$ | 3-CH$_3$ | do | —C$_2$H$_5$ | —CH$_2$CH$_2$— | do | red. |
| 18 | 4-CH$_3$ | 3-CH$_3$-6-OCH$_3$ | do | —C$_2$H$_4$OH | —CH$_2$CH$_2$— | do | red. |
| 19 | 4-CH$_3$ | 3-Cl | do | —C$_2$H$_4$CN | —CH$_2$CH$_2$— | do | orange. |
| 20 | 4-SO$_2$NH$_2$ | 2-Cl | do | —C$_2$H$_4$Cl | —CH$_2$CH$_2$— | do | Do. |
| 21 | 4-NHCOCH$_3$ | 3-CH$_3$ | m-Cl | —C$_2$H$_5$ | —CH$_2$CH$_2$— | do | Do. |
| 22 | 4-NO$_2$ | 3-CH$_3$ | m-Cl | —C$_2$H$_5$ | —CH$_2$CH$_2$— | do | Do. |
| 23 | 4-SO$_2$CH$_3$ | 3-CH$_3$ | m-Cl | —C$_2$H$_5$ | —CH$_2$CH$_2$— | do | Do. |
| 24 | 3-CH$_2$OH | 3-CH$_3$ | m-tolyl | —C$_2$H$_5$ | —CH$_2$CH$_2$— | do | red. |
| 25 | none | 3-CH$_3$ | m-OCH$_3$ phenyl | —C$_2$H$_5$ | —CH$_2$CH$_2$CH$_2$— | do | orange. |
| 26 | none | 3-CH$_3$ | m-NHCOCH$_3$ phenyl | —C$_2$H$_5$ | —CH$_2$CH$_2$CH$_2$— | do | pink. |
| 27 | none | none | m-tolyl | —C$_2$H$_4$OCOCH$_3$ | —CH$_2$CH$_2$— | maleimido | red. |
| 28 | none | none | do | —C$_2$H$_4$OC(O)NHC$_6$H$_5$ | —CH$_2$CH$_2$— | do | red. |
| 29 | none | none | do | —C$_2$H$_4$CONH$_2$ | —CH$_2$CH$_2$— | do | red. |
| 30 | none | none | do | —C$_2$H$_4$SO$_2$CH$_3$ | —CH$_2$CH$_2$— | do | red. |
| 31 | none | none | do | —C$_2$H$_4$NHCOCH$_3$ | —CH$_2$CH$_2$— | do | red. |
| 32 | none | none | do | —C$_2$H$_4$OCH$_3$ | —CH$_2$CH$_2$— | do | red. |
| 33 | none | none | do | —C$_2$H$_4$CO$_2$C$_2$H$_5$ | —CH$_2$CH$_2$— | do | red. |
| 34 | none | none | do | —C$_6$H$_5$ | —CH$_2$CH$_2$— | do | red. |
| 35 | none | none | do | —cyclohexyl | —CH$_2$CH$_2$— | do | red. |
| 36 | none | none | o-tolyl | —H | —CH$_2$CH$_2$— | do | orange. |

What we claim is:

1. A water-insoluble compound having the formula

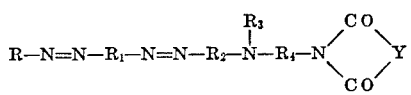

wherein

R is a monocyclic carbocylic aromatic radical of the benzene series;

phenylene or lower alkyl-p-phenylene; and $R_3$ is lower alkyl.

6. The compound

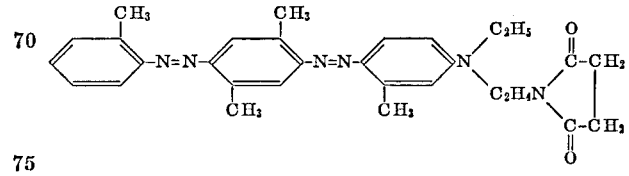

7. The compound
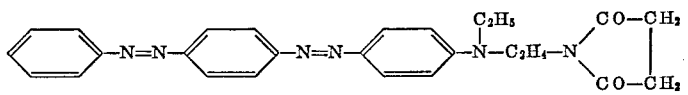
8. The compound
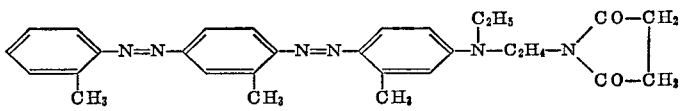
9. The compound
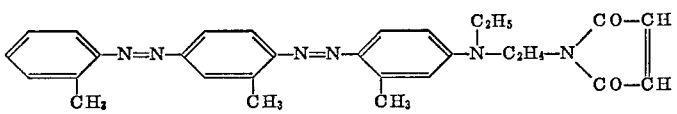
10. The compound
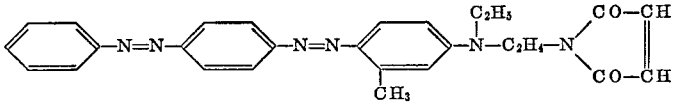
References Cited
UNITED STATES PATENTS
3,342,799    9/1967    Wallace et al. _____ 260—152
CHARLES B. PARKER, *Primary Examiner.*
DONALD M. PAPUGA, *Assistant Examiner.*
U.S. Cl X.R.
260—37; 8—41, 55, 50